United States Patent [19]

Leonard et al.

[11] Patent Number: 4,902,218

[45] Date of Patent: Feb. 20, 1990

[54] NOZZLE FOR PLASTIC INJECTION MOULD

[75] Inventors: Roland Leonard, Maisons-Laffitte; Louis Ramond, Cergy, both of France

[73] Assignee: Société à Responsabilité Limitée dite: Delta projet, Saint-Quen-L'Aumone, France

[21] Appl. No.: 288,451

[22] Filed: Dec. 22, 1988

[30] Foreign Application Priority Data

Dec. 24, 1987 [FR] France ............................ 87 18173

[51] Int. Cl.⁴ ............................................ B29C 45/20
[52] U.S. Cl. .............................. 425/549; 264/328.11; 264/328.15; 425/564; 425/DIG. 227
[58] Field of Search ............... 425/549, 564, 568, 570, 425/571, DIG. 227; 264/328.15, 328.11

[56] References Cited

U.S. PATENT DOCUMENTS 4,279,588  7/1981  Gellert ................................ 425/549
4,663,811  5/1987  Gellert ................................ 425/564

Primary Examiner—Jay H. Woo
Assistant Examiner—Timothy W. Heitbrink
Attorney, Agent, or Firm—Fisher, Christen & Sabol

[57] ABSTRACT

Mold nozzle for injecting plastic material, constituted by a cylindrical body forming sleeve, associated with a heating device and integrated in a receiving housing provided in the thickness of a mold. The nozzle opens out via a downstream orifice in the interior of the mold and is adapted to receive via its upstream orifice, opposite the preceding one, the flux of material injected from the molding machine nozzle. The mold nozzle is constituted by a first fixed cylindrical sleeve (3), which is immobilized on the wall of the mold and acts as the upstream orifice for the admission of the material. The nozzle has a second mobile sleeve (4), colinear with respect to the first sleeve, and mounted to slide telescopically inside of the first sleeve. The end (5) of the second sleeve, opposite of the end engaged in the first sleeve, comes into abutment against the wall (9) of the receiving housing (8) provided in the thickness of the mold (2). The pressure of the injected material (4) thus tends to apply the end of the sliding sleeve against the wall (9) of the housing, thereby ensuring tightness of the assembly.

7 Claims, 1 Drawing Sheet

U.S. Patent  Feb. 20, 1990  4,902,218
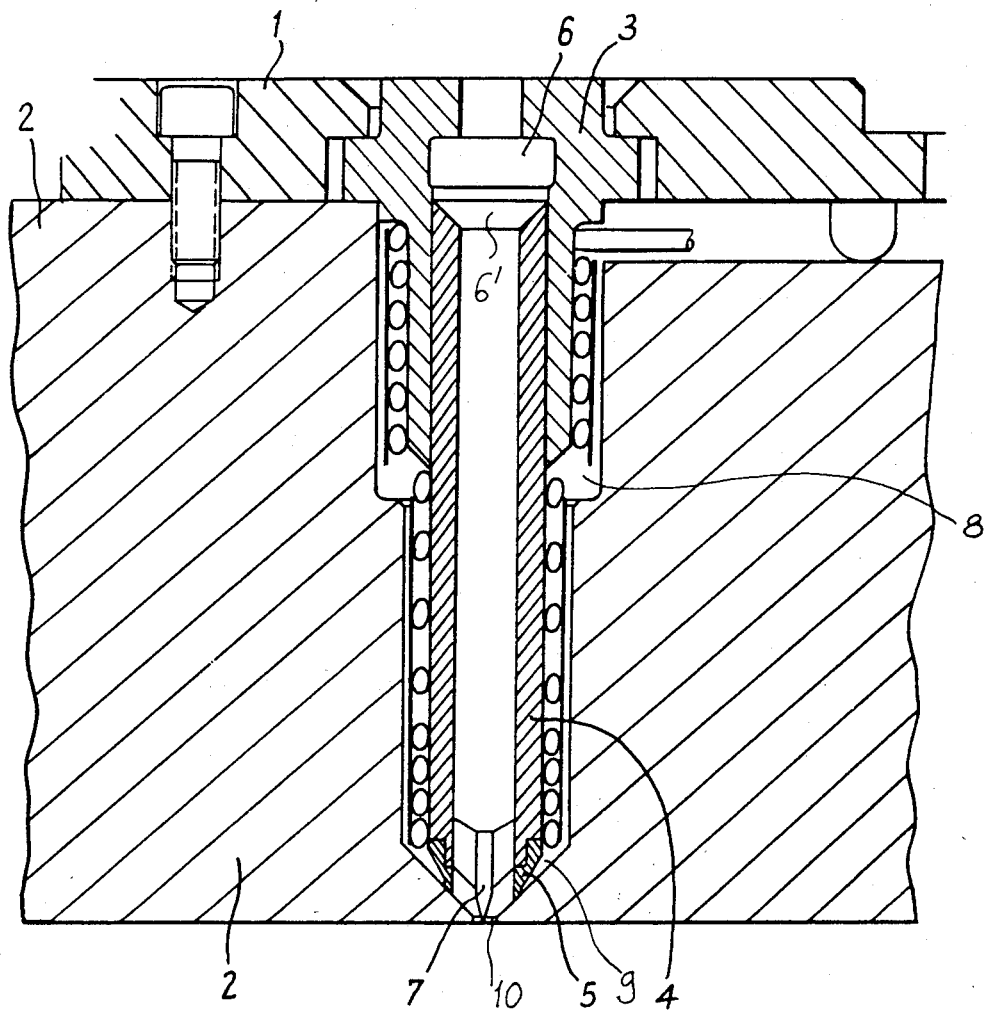

NOZZLE FOR PLASTIC INJECTION MOULD

The present invention relates to a nozzle passing through the walls of a mould adapted to receive an injection of synthetic material in the plastic state.

The invention relates more especially to a nozzle adapted to be positioned on a mould, passing through the thickness of the mould, an upstream end of the nozzle being connected to the injection machine, such as an injection moulding machine, and being adapted to receive the flux of plastic material in the pasty state, the nozzle traversed by a longitudinal channel opening inside the mould via a downstream inlet orifice thus enabling the material injected from the moulding machine to penetrate inside the empty space defined by the mould and which, once filled with the cooled material, constitutes the moulded object.

Such nozzles are generally provided with a flange which projects on the outer wall of the mould, flange via which the nozzle is fixed on the mould.

The flange surrounds the upstream orifice by which the mould nozzle is brought into direct contact with the injection nozzle located on the moulding machine.

The nozzle is generally in the form of a generally cylindrical body traversing a housing made in the thickness of the walls of the mould, to open out via the downstream end inside the mould, at the level of the cavity or mould joint.

The nozzle is associated with heating means which make it possible to maintain the temperature of the injected material within the necessary limits until this material has penetrated inside the mould, avoiding a cooling bringing about a beginning of solidification of the material with obvious drawbacks both at the level of the rheological functioning of the assembly and at the level of the distribution of the moulded material within the mould.

The mould nozzles positioned in the thickness of a mould must therefore, within the scope of the techniques known at present, be provided with dimensions enabling them, on the one hand, to come into abutment by their outer flange on the outer wall of the mould, whilst coming, by their inlet orifice in the mould, into contact with the bottom of the receiving housing, bottom comprising an opening to the interior of the mould.

These nozzles must therefore be adjusted extremely precisely so that their length, when the flange is in abutment on the outer surface of the mould, enables the opposite end to come into tight contact with the bottom of the receiving housing.

It is seen that these characteristics are difficult to produce, all the more so as it is necessary to take into account the expansion which necessarily affects the conduit and wall of the nozzle when this latter is traversed by the flux of plastic material at a temperature of the order of 150° to 350° C.

The present invention relates to an improved nozzle which presents considerable advantages over the prior known system.

A first object of the invention is to produce a nozzle which may be adapted to various dimensions of receiving housing, i.e. to variable mould thicknesses.

Another object of the invention is to produce a nozzle which ensures an efficient and complete heating of the material until it penetrates inside the mould, avoiding any zone of cooling.

This characteristic is particularly precious in the increasingly frequent case of a moulding material constituted by a mixture of resin being used.

It may be advantageous to mould a particular product not with a homogeneous resin but a mixture of several resins, each contributing its specific characteristics.

However, account must be taken of the fact that each resin has a particular range of use which is defined by the temperature range between the temperature of softening of the resin and the temperature of decomposition; this range may sometimes be relatively narrow, over some tens of degrees.

In the case of a mixture of two resins, it is necessary to use this mixture within the possibly very narrow temperature slot in which the two components are each within their ranges of useful temperature (between softening and decomposition).

Under these conditions, it is advantageous to have a nozzle available which makes it possible to finely adjust and regulate the temperature of the injected material up to the inlet zone in the cavity.

Another object of the invention is to make it possible to obtain automatic, constant and perfect tightness between the downstream orifice of the nozzle, substantially at the opening of the receiving housing towards the interior of the mould, and the wall of this housing placed in register.

The invention further allows the nozzle to be adapted to conditions specific to each use, for example to diameters of passage, allowing flowrates of material depending on different values.

To that end, according to the invention, there is provided a mould nozzle for injecting plastic material, constituted by a cylindrical body forming sleeve, associated with heating means and integrated in a receiving housing provided in the thickness of a mould, the nozzle opening out via a downstream orifice to the interior of the mould and being adapted to receive via its upstream orifice, opposite the preceding one, the flux of material injected from the moulding machine nozzle, and the mould nozzle is characterized in that it is constituted by a first fixed cylindrical sleeve, immobilized on the wall of the mould and comprising said upstream orifice for the admission of the material, this orifice being adapted to receive in abutment the injection end of the nozzle, and the nozzle comprises a second mobile sleeve, colinear with respect to the first, and mounted to slide telescopically inside the first sleeve, the end of this second sleeve, opposite the end engaged in the first sleeve, coming into abutment against the wall of the receiving housing provided in the thickness of the mould and constituting the opening for emergence of the material moulded in the cavity, the pressure of the injected material exerting on the upstream section of the second sliding sleeve thus tending to apply the opposite end of this sliding sleeve against the wall of the housing, ensuring tightness of the assembly.

According to another feature, the truncated end of the second sleeve, opposite the end engaged in the first sleeve, presents an angle of value less than the angle constituted by the truncated end of the receiving housing, on which said end of the sleeve comes into abutment, the terminal cone of the sliding sleeve thus coming into circular contact with the truncated inner wall of the housing, ensuring tightness and automatic self-centering of one wall on the other.

According to another feature, the fixed sleeve comprises, in manner known per se, in its part projecting beyond the wall of the mould, a flange of diameter greater than the diameter of the receiving housing, said flange being fixed on the outer wall of the mould.

According to a further feature, the downstream opening of the nozzle, disposed at the downstream end of the sliding sleeve, comprises a transverse web located along a diameter of the inner channel traversing said sleeve, and this web is extended up to the opening of the receiving housing of the nozzle in the inner space of the mould, said transverse web allowing the transmission of the calories from the wall of said sliding sleeve to the streams of material in the course of injection, penetrating inside the cavity.

According to a feature of the invention, the fixed sleeve internally comprises a cylindrical bore forming chamber in which slides one end of the sliding sleeve, this chamber comprising a section of diameter greater than the diameter of the circumference defining the zone of contact of the downstream point of the sliding sleeve on the truncated wall defining the bottom of the receiving housing of the nozzle.

Other features and advantages of the invention will be seen from the following description given in connection with an embodiment presented by way of nonlimiting example and with reference to the accompanying FIGURE.

In the drawing:

The FIGURE is a vertical cross-section of one embodiment of the mold nozzle of the invention.

It is seen from the FIGURE that, on the mould 2 is mounted, via the flange 1, the fixed part 3 of the nozzle constituting the fixed sleeve.

In the chamber 6 constituting the inner bore of this sliding sleeve, is movably and slidably mounted the mobile sleeve 4 sliding inside the chamber 6 and of which the downstream end 5 is generally truncated in shape.

The nozzle assembly is disposed inside the housing 8 of which the lower part 9 forms a truncated wall opening at its centre in the interior of the mould 2.

There has been provided at the level of the truncated point 5, a transverse web 7 disposed in the channel 10 along a diameter of said cylindrical channel; this web extends downwardly as far as the opening of the truncated bottom 9 of the housing 8 inside the space of the cavity.

The outer wall of the sliding sleeve 4 is provided, in manner not shown, with resistance which heats the nozzle and maintains the flux of material at a suitable temperature; the web 7 thus transmits the calories from the walls of the sliding sleeve 4, to the core of the streams of material in the course of flow which penetrate in the mould.

It is seen that the transverse section 6' of the sliding sleeve, disposed inside the chamber 6, comprises a section on which is exerted the pressure of the material coming from the moulding machine; this section is greater than the section of flow of the material within the channel 10.

The transverse section 6' is in the form of a female truncated bevel, and the force exerted on this face thus comprises a centrifugal radial component which tends to apply the top of the sliding sleeve on the receiving bore formed by the fixed sleeve.

In addition, the positive differential pressure provokes automatic application of the point 5 on the truncated receiving wall 9, thus ensuring automatic tightness of the two zones in contact.

This tightness is all the better ensured as the contact of the truncated point 5 on the truncated face 9, of larger angle, allows a contact along a circular zone with automatic self-centering.

Under these conditions, a perfect tightness is obtained at the level of the mould nozzle, obtained automatically without calculation and adapted to various values of thickness of the mould, the length of the nozzle being automatically adapted to the length of the housing in which it is inserted.

It is seen that, under these conditions, a nozzle according to the invention may be adapted to a range of receiving housings of variable length.

It is thus no longer necessary to provide a nozzle strictly adjusted to the dimensions of the receiving housing; the adjustment may be very approximate and comprise very broad tolerances since the pressure of the injected material will automatically make up the clearance and allow the sliding sleeve to be applied in the bottom of the housing, thus ensuring tightness upon passage of the material.

Similarly, within the framework of the embodiment of the invention, there is no need to deal with problems of expansion during admission of the material and passage thereof in the nozzle, the possible expansion being automatically made up by a movement of the sliding sleeve inside the fixed sleeve 3.

We claim:

1. Mold nozzle for injecting plastic material, the mold nozzle being positioned in a mold, said mold having an interior and a thickness, the mold nozzle including a cylindrical body forming sleeve associated with heating means and integrated in a receiving housing provided in the thickness of the mold, said mold nozzle having an upstream orifice and a downstream orifice, the mold nozzle opening out via said downstream orifice to the interior of the mold and said mold nozzle being adapted to receive via said upstream orifice material injected from a molding machine nozzle, and the mold nozzle having a first fixed cylindrical sleeve (3) immobilized in the mold, said first fixed cylindrical sleeve comprising said upstream orifice for admission of the material, the upstream orifice being adapted to receive in abutment an injection end of the molding machine nozzle, the mold nozzle further comprising a second slidable sleeve (4) colinear with respect to the first fixed cylindrical sleeve, said second slidable sleeve mounted to slide telescopically inside of the first fixed cylindrical sleeve, a first end (5) of the second sleeve, opposite a second end engaged in the first sleeve, coming into abutment against a wall (9) of a receiving housing (8) provided in the thickness of the mold (2), said receiving housing constituting an opening for emergence of the material molded in the mold, the injected material exerting a pressure on an upstream section (6') of the second slidable sleeve (4) thus tending to apply the first end (5) of this sliding sleeve against the wall (9) of the housing, ensuring tightness therebetween.

2. Mold nozzle according to claim 1 wherein the first end of the second slidable sleeve (4) is truncated (5) and having an angle of value greater than an angle formed by a truncated end (9) of the wall of the receiving housing (8) on which said end of the second sleeve comes into abutment, the second slidable sleeve having an interior cone which thus comes into circular contact with the truncated end of the wall of the receiving housing, ensuring automatic self-centering of the truncated end (5) of the second slidable sleeve in the truncated end of the wall of the receiving housing.

3. Nozzle according to one of claims 1 or 2 wherein the fixed sleeve (3) comprises a part projecting beyond the mold, said part having a flange (1) of diameter greater than the diameter of the receiving housing, said flange being fixed on an outer wall of the mold.

4. Nozzle according to claim 3 wherein the downstream orifice of the mold nozzle, disposed at the first end of the second slidable sleeve, comprises a transverse web (7) located along a diameter of an inner channel (10) traversing said second slidable sleeve, said transverse web extending up to the opening of the receiving housing (8) of the nozzle, said transverse web allowing transmission of calories from said sliding sleeve to the material.

5. Nozzle according to claim 4 wherein the fixed cylindrical sleeve (3) internally comprises a cylindrical bore (6) forming a chamber in which slides the second slidable sleeve (4).

6. Nozzle according to claim 1 wherein the downstream orifice of the mold nozzle, disposed at the first end of the second slidable sleeve, comprises a transverse web (7) located along a diameter of an inner channel (10) traversing said second slidable sleeve, said traversing web extending up to the opening of the receiving housing (8) of the nozzle, said transverse web allowing transmission of calories from said sliding sleeve to the material.

7. Nozzle according to claim 1 wherein the fixed cylindrical sleeve (3) internally comprises a cylindrical bore (6) forming a chamber in which slides the second slidable sleeve (4).

* * * * *